United States Patent

[11] 3,587,687

[72] Inventors Halbert R. Hill;
Garfield C. Siverson, 3112 Produce Row, Houston, Tex. 77023
[21] Appl. No. 823,064
[22] Filed May 8, 1969
[45] Patented June 28, 1971

[54] SALAD MAKING APPARATUS
8 Claims, 3 Drawing Figs.

[52] U.S. Cl. ................................................ 146/78, 146/123
[51] Int. Cl. ................................................ B26d 1/00
[50] Field of Search ........................................ 146/123, 98, 78

[56] References Cited
UNITED STATES PATENTS

| | | | |
|---|---|---|---|
| 2,114,020 | 4/1938 | Froney .......................... | 146/78 |
| 2,758,697 | 8/1956 | Schultz .......................... | (146/98UX) |

Primary Examiner—Willie G. Abercrombie
Attorney—Pravel, Wilson and Matthews

ABSTRACT: Apparatus for cutting heads of lettuce, cabbage and the like into random sizes and shapes for use in salads so that the cut pieces appear to be hand-cut.

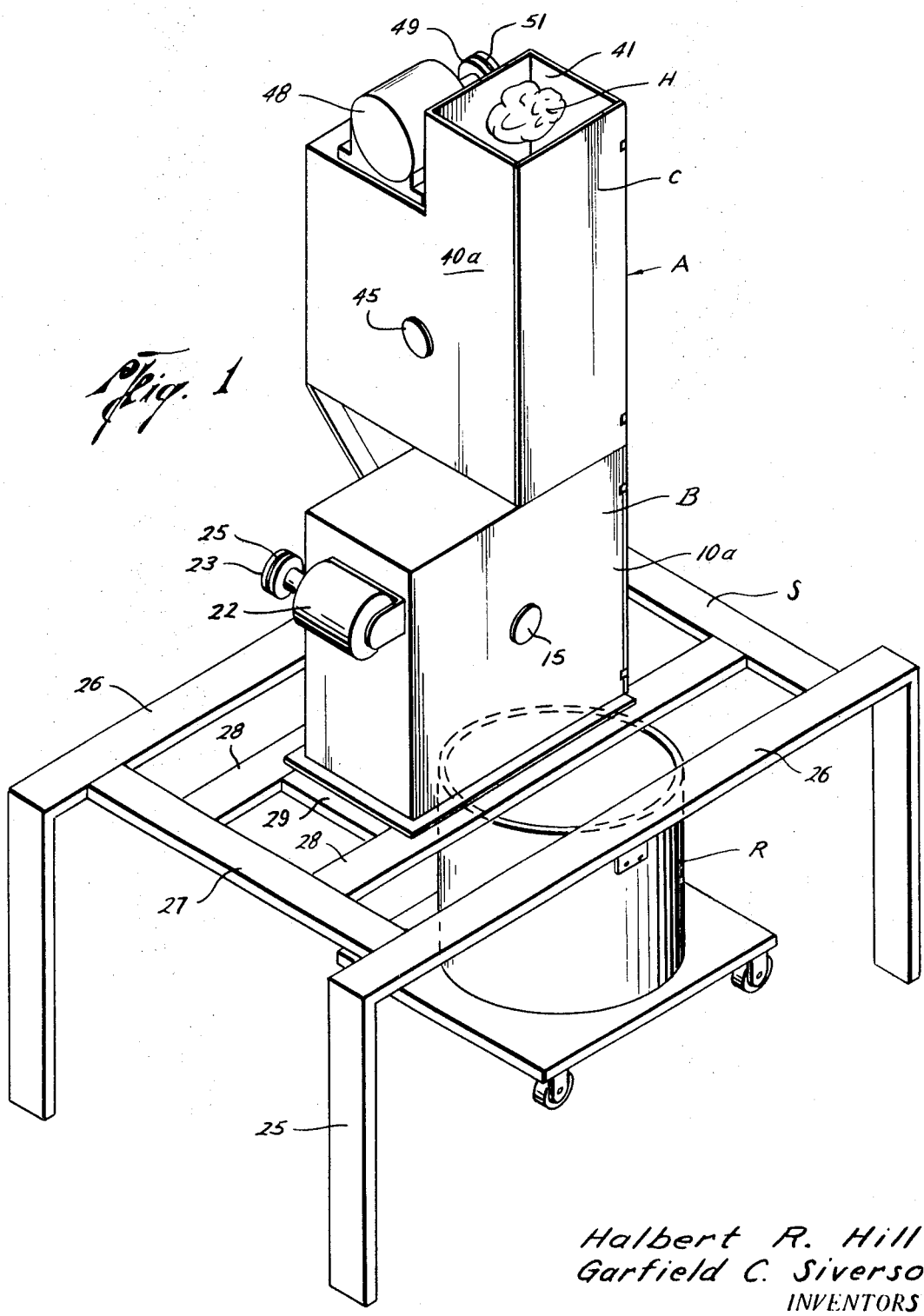

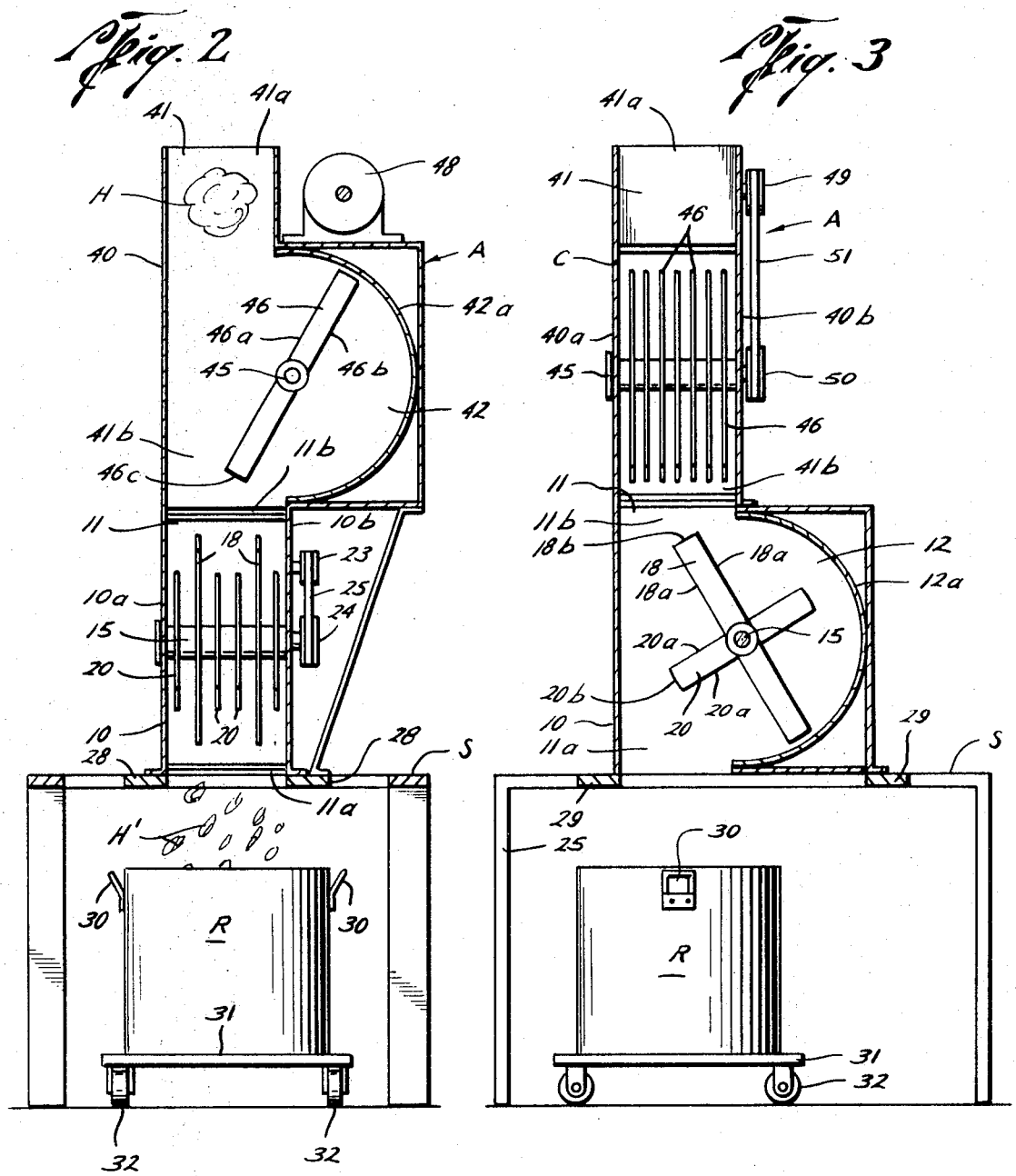

SALAD MAKING APPARATUS

BACKGROUND OF THE INVENTION

The field of this invention is apparatus for slicing, chopping or otherwise cutting heads of lettuce, cabbage, and the like into pieces for use in salads.

Heretofore, heads of lettuce and cabbage have been cut into pieces for salads by hand held or operated knives or cutters. Although attempts have been made in the past to obtain apparatus for cutting lettuce and/or cabbage into pieces suitable for commercial salads in restaurants, hospitals, dining rooms, cafeterias, and similar commercial operations, so far as is known, none have successfully produced such lettuce and/or cabbage sufficiently rapidly for commercial production, or in pieces which are of the desired size and shape so as to appear to have been cut by hand.

SUMMARY OF THE INVENTION

With the present invention, heads of lettuce, cabbage and the like are dropped into the apparatus and as they fall therethrough, rotating knife blades slice or cut through the heads rapidly so as to cut and separate the leaves into pieces suitable for making salads. Preferably, the pieces of the lettuce and/or cabbage are irregularly shaped due to cutting by blades of different lengths disposed in a row along a common shaft and adjacent to each other. The axis of rotation of the cutter blades is offset with respect to the chute through which the heads of lettuce fall, and in one form of the invention, a pair of cutting units are mounted with the axis of rotation of an upper set of cutter blades substantially perpendicular to the axis of rotation of a lower set of cutter blades.

BRIEF DESCRIPTION OF THE DRAWING

FIG. 1 is an isometric view of one form of the apparatus of this invention;

FIG. 2 is a vertical sectional view from one end of the apparatus of this invention; and FIG. 3 is a vertical sectional view taken from one side of the apparatus of this invention.

DESCRIPTION OF THE PREFERRED EMBODIMENTS

In the drawing, the apparatus is designated generally with the letter A, and such apparatus includes a first cutter unit B and a second cutter unit C, which are mounted together in the preferred form of the invention. The cutter units B and C are disposed on a suitable support S so as to position the discharge or lower end of the cutter unit B above any suitable type of receiving apparatus R. With the present invention, briefly, a head H of lettuce, cabbage or the like is introduced into the upper cutter unit C and is allowed to fall freely through such cutter unit C and the cutter unit B while the cutter blades therein cut the head H into pieces H' (illustrated in representative form in FIG. 2), and such pieces H' are received in the container or receptacle R. As will be more evident hereinafter, such pieces H' are suitable for use in making salads and they preferably are cut so that they appear to be hand-cut lettuce or cabbage.

Considering the invention more in detail, the first cutter unit B is formed with a housing 10 of sheet metal or similar material. The housing 10 is formed with a longitudinal chute 11 as one part thereof, and a blade assembly chamber 12 as another part thereof. The blade assembly chamber is preferably defined by a curved partially circular plate 12a, although the exterior of the housing 10 is essentially rectangular as best seen in FIG. 1.

A cutter blade shaft 15 is mounted on the side walls 10a and 10b of the housing 10 (FIG. 2), and such shaft 15 is offset laterally with respect to the longitudinal chute 11 (FIG. 3).

In the preferred form of the invention, the shaft 15 has mounted thereon a plurality of cutter blades 18 and 20, with the longer blades being designated with the numeral 18 and the shorter blades being designated with the numeral 20.

Although the particular number and arrangement of the blades 18 and 20 may vary, depending upon the cutting action desired and the speed of operation of the apparatus, the preferred apparatus includes two of the longer cutting blades 18, with a shorter blade 20 on each side of each of the longer blades 18. Such blades 18 and 20 are spaced laterally with respect to each other (FIG. 2) and preferably the shorter blades 20 are disposed substantially perpendicular to the longer blades 18, although this may also be varied. The blades 18 and 20 together occupy substantially the full width of the longitudinal chute 11 so that any head H falling through the chute 11 will be cut by some or all of the blades 18 and 20.

By providing the shorter blades 20 with the longer blades 18, the lettuce, cabbage or the like is cut into random sizes or pieces so as to more nearly resemble hand-cut lettuce, cabbage or the like to provide a more acceptable commercial salad product.

The shaft 15 is operably connected to any suitable source of power such as an electric motor 22 (FIG. 1) which is connected by pulleys 23 and 24, with a V-belt 25 or other suitable drive mechanism forming the connection therebetween. The motor 22 or other power source preferably rotates the cutter blades 18 and 20 at a relatively high speed, such as 400 r.p.m. Since the blades 18 and 20 are secured to the shaft 15, they are of course rotated therewith and since the shaft 15 is inset into the cutter blade assembly chamber 12, only the halves of the blades 18 and 20 which pass into the chute 11 actually extend into such chute 11. Thus, the shaft 15 does not provide any obstruction to the falling heads of lettuce, cabbage or the like.

The shaft 15 may be rotated in either direction, and in most instances, the motor 22 is a reversible motor, or is reversed by the changing of the belt 25. For this reason, the side edges 18a, and also the ends 18b of the blades 18, and the side edges 20a and the ends 20b of the blades 20 are sharpened so as to provide a sharp cutting edge for the blades 18 and 20, regardless of the direction of rotation thereof. In the normal operation, the shaft 15 and the blades 18 and 20 are rotated in a counterclockwise direction (as viewed in FIG. 3), and each head H is cut two or three times in the process of falling through the blades.

The lower end of the chute 11 indicated at 11a is open to serve as a discharge for the pieces H' which fall therethrough. The lower end of the housing 10 for the cutter unit B is welded, bolted or otherwise suitably secured to the support or frame S. Such support or frame S has a plurality of vertically extending legs 25, which are interconnected with longitudinally extending frame members 26 and laterally extending frame members 27 (FIG. 1). Intermediate frame members 28 serve as the direct support for the sides of the housing 10, and additional brace plates 29 which are welded to the plates 28, or are otherwise suitably secured thereto, are also preferably utilized. In any event, there is a space between the frame members 28 and 29 as seen in FIGS. 2 and 3 which leaves the opening 11a of the chute 11 unrestricted so that the leaves or pieces H' which have been cut by the apparatus A may fall therethrough unobstructed into the container or other receiver R. Preferably the receiver R is a large metal pot with handles 30 thereon and which is mounted on a rolling dolly or platform 31 having wheels 32.

Instead of the receiver R, a moving conveyor belt or any other type of receiving device may be employed.

In many instances, the apparatus A of this invention may be utilized with just the cutter unit B, and without requiring the cutter unit C thereabove, but in the preferred form of the invention, a cutter unit C having a housing 40 which has a chute 41 therethrough and a cutter blade chamber 42 therein is utilized. Such chamber 42 is preferably formed in substantially the same manner as the chamber 12 and it has a circular plate 42a therein. The upper end 41a of the chute 41 is open for receiving the heads H of lettuce, cabbage or the like, and the lower end 41b is open for alignment with and discharge into the open upper end 11b of the chute 11. Thus, the chutes 41 and 11 form a continuous chute of substantially the same size from the upper end 41a to the lower end 11a.

The second cutter unit C is disposed substantially perpendicularly to the lower cutter unit B, but with the chutes 41 and 11 aligned as seen in FIGS. 1—3.

The upper cutter units C has a rotatable shaft 45 supported by the sides 40a and 40b of the sheet metal housing 40. A plurality of cutter blades 46, preferably of equal length, are mounted on the shaft 45 for rotation therewith. Power is supplied to the shaft 45 for rotating same by any suitable means such as an electric motor 48 (FIGS. 1 and 2) which is connected to the shaft 45 through pulleys 49 and 50, and an interconnecting belt 51.

As seen in FIG. 2, the shaft 45 is offset from the longitudinal chute 41, but the blades 46 are adapted to extend into the chute 41 upon rotation thereof in either direction. Normally, the blades 46 are rotated in a counterclockwise direction as viewed in FIG. 2, and preferably all of the blades 46 are in alignment with each other and have sharp side edges 46a and 46b. The ends 46c may also be sharp for additional cutting action.

In the use of the apparatus A of this invention, the heads H of lettuce, cabbage or the like are dropped into the open upper end 41a of the chute 41 from any suitable source such as a conveyor (not shown) or by hand. The blades 46 in the cutter assembly for the unit C are rotating at relatively high speeds such as about 400 r.p.m. and the lower cutter assembly which includes the blades 18 and 20 are also rotating at relatively high speeds.

The upper blades 46 are rotating fast enough to make several cuts through each head H as it falls downwardly through the chute 41 so as to cut the head into pieces in one direction. Such pieces then fall into the upper end 11b of the chute 11 and then the blades 18 and 20 cut such pieces in the opposite direction from the blades 46 and in random cuts because of the different lengths of the blades 18 and 20 so that the pieces H' falling from the discharge opening 11a are relatively small and are of random sizes suitable for use in salads and the like.

In some instances, where the heads H are relatively small or are easily separated into their respective pieces by the cutting action of the lower unit B, the upper unit C may be omitted and all the cutting action may be accomplished with the blades 18 and 20. It will be understood that the heads H may be continuously fed into the open upper end 41a of the chute 41 and the cut pieces H' may be continuously removed from the apparatus A. It will also be understood that the apparatus A is preferably made of stainless steel for the parts which are in contact with the food, but other suitable materials may be used providing they provide sanitary qualities such as provided by stainless steel.

The foregoing disclosure and description of the invention are illustrative and explanatory thereof, and various changes in the size, shape, and materials as well as in the details of the illustrated construction may be made without departing from the spirit of the invention.

I claim:

1. An apparatus for cutting heads of lettuce, cabbage and the like into pieces suitable for making salads, comprising:
   a. a first cutter unit having a housing;
   b. said housing having a longitudinal chute on one side thereof and a blade assembly chamber laterally offset therefrom;
   c. a cutter blade assembly disposed partially in said blade assembly chamber and extending into said longitudinal chute upon a rotation thereof;
   d. a shaft in said housing for supporting said blade assembly for rotation;
   e. said cutter blade assembly including a plurality of cutter blades spaced from each other along said shaft and rotatable therewith; and
   f. some of said cutter blades being of different lengths than others of said cutter blades to provide random-sized pieces of the lettuce, cabbage or the like.

2. The apparatus set forth in claim 1, including:
   a. a second cutter unit having a housing disposed above said housing for said first cutter unit;
   b. said second cutter unit housing having a longitudinal chute on one side thereof disposed in longitudinal alignment with said chute of said first cutter unit;
   c. said second cutter unit housing also having a blade assembly chamber laterally offset from said longitudinal chute;
   d. a second cutter assembly shaft in said housing for said second cutter unit disposed substantially perpendicular to said shaft for said first cutter assembly; and
   e. a second cutter blade assembly mounted on said second cutter assembly shaft and rotatable therewith and having blades extending into said longitudinal chute of said second cutter unit upon rotation thereof.

3. The apparatus set forth in claim 2, wherein said second cutter blade assembly includes:
   a. a plurality of cutter blades spaced from each other along said shaft and rotatable therewith so as to occupy substantially the full cross section of said longitudinal chute of said second cutter unit.

4. The apparatus set forth in claim 2, wherein said second cutter blade assembly includes:
   a. a plurality of cutter blades spaced from each other along said shaft and rotatable therewith so as to occupy substantially the full cross section of said longitudinal chute of said second cutter unit; and
   b. said blades being of the substantially same length and aligned with each other.

5. The apparatus set forth in claim 2, including:
   a. power means for rotating each of said shafts and said cutter blade assemblies therewith.

6. The apparatus set forth in claim 1, including:
   a. power means for rotating said shaft and said cutter blades therewith; and
   b. each of said cutter blades having both of its sides formed with a sharp edge for cutting in either direction of rotation of said cutter blades.

7. The structure set forth in claim 1, wherein:
   a. said shaft is laterally offset with respect to said longitudinal chute whereby only said cutter blades extend into said longitudinal chute.

8. The structure set forth in claim 1, wherein:
   a. the lower end of said longitudinal chute is open for the discharge of lettuce, cabbage or the like which has been cut by said cutter blades.